United States Patent [19]

Last et al.

[11] 4,454,436
[45] Jun. 12, 1984

[54] DISC-SHAPED M.H.D. GENERATOR

[75] Inventors: Anthony J. Last, Oakville; John D. Chato, Nelson, both of Canada

[73] Assignee: B O Development Enterprises Ltd., Vancouver, Canada

[21] Appl. No.: 391,956

[22] Filed: Jun. 21, 1982

[51] Int. Cl.³ .............................................. H02N 4/02
[52] U.S. Cl. ................................................... 310/11
[58] Field of Search ........................................ 310/11

[56] References Cited

U.S. PATENT DOCUMENTS 3,517,229  6/1970  Bidard .
3,586,890  6/1971  Klein et al. ............................. 310/11
3,622,817  11/1971  Isaacson ................................. 310/11

*Primary Examiner*—Donovan F. Duggan
*Attorney, Agent, or Firm*—Sim & McBurney

[57] ABSTRACT

There is provided a magneto-hydrodynamic generator which utilizes pulsating combustion. The generator has a central combustion chamber and a radial expansion chamber annularly surrounding the combustion chamber and communicating with it. The expansion chamber is defined between two opposing walls. A combustible fuel mixture is introduced into the combustion chamber and pulsating combustion is initiated in the combustion chamber, so that gas flow in the expansion chamber fluctuates with time. Means are provided for ionizing gas in the expansion chamber, and further means are provided for applying an external magnetic field to the expansion chamber. Finally, electrically conductive means are provided for extracting electrical power from the ionized fluctuating gas flow in the expansion chamber.

24 Claims, 5 Drawing Figures

DISC-SHAPED M.H.D. GENERATOR

This invention relates generally to the field of magneto-hydrodynamic generators using pulsating combustion, and has particularly to do with the design and operation of a disk-shaped M.H.D. generator for the generation of electrical power.

BACKGROUND OF THIS INVENTION

Faraday's Law states that the movement of a conductor across a magnetic field produces a current in the conductor. In M.H.D. power generation the conductor is an ionized gas moving across the magnetic field. Ionized gas is produced by extremely high temperatures (plasmas) or lower temperatures combined with alkali metal seedings. If the flow of ionized gas is perpendicular to the applied magnetic field, an electric field is generated perpendicular to both magnetic field and ionized gas flow directions. Electricity can be extracted from this energy transfer either by placing electrodes in the electric field and drawing current from them, or by inducing current in a search coil by strategically placing the coil in the vicinity of the ionized gas in motion.

The problems of containing high temperature plasmas by the pinch effect of magnetic fields, and also the extreme corrosivity of the alkali metal seeding, have not yet been resolved. A third method for ionizing gases (and the one preferred here) is that of using high speed shock waves to induce ionization. In this way the very high temperature of the plasma and the corrosion of the alkali seed are avoided.

Experiments with linear shock tubes have shown that it is advantageous to produce an ionized gas which is homogeneous, free of currents, and which can be changed in composition and degree of ionization. Electromagnetic shock tubes can result in high Mach numbers, but the shock-induced ionization is often unstable, inhomogeneous and perturbed by eddy currents. Membrane shock tubes do not provide for reaching as high a Mach number and therefore do not produce as high a degree of ionization. Efforts made to increase sonic speeds in the driver gas of the membrane shock tube led to the use of combustible mixtures of hydrogen and oxygen as driver gas. Higher Mach numbers were obtained than was possible with cold hydrogen at the same pressure ratio. The continuous breaking of membranes from the energy of a hydrogen/oxygen explosive combustion is expensive and difficult from an engineering point of view. This is due to the fact that moveable parts are involved, since fresh membranes must be presented to the explosion.

GENERAL DESCRIPTION OF THIS INVENTION

The present invention seeks to avoid the problems of moving parts by using a pulsating self-compressing combustion chamber known as a pulsating combustor. This unit is circular in shape and the shock wave expands radially outwardly into a duct which decreases in width (on the cross section) in order to preserve the volumetric requirement of the expanding shock wave. In appearance, it is similar to two saucers facing one another.

By applying a magnetic field perpendicularly to the plane of the disc, i.e. with the flux lines extending substantially parallel with the disc axis, charge movement in the duct lies in the plane of the disc and is directed somewhere between radial and transverse. Since the transverse component acts in the same sense at all positions about the vertical axis of the disc (for example, clockwise for an expanding shock front and counterclockwise for a contracting front) it might be feasible to indirectly couple into a coil-set mounted parallel to the disc above and/or below it.

Direct coupling for such a design would require internal radial electrodes, which could interfere with pulsing operation. To avoid dissipation of electrical energy with the electrodes due to currents flowing in the plane of the electrodes, they would need to be radially segmented, with individual loads for each segment pair.

An alternative approach is to use a solenoidal magnetic field produced with a toroidal winding, thus providing magnetic flux lines circumferentially within the disc-like expansion chamber. In this case, charge flow will have a component perpendicular to the direction of motion of the shock front, and pairs of radially segmented electrodes placed in the expansion chamber parallel to the duct surface could be used to collect current from the plasma. This constitutes one form of the invention herein disclosed.

In the simple pulsating-combustion unit, combustion is started by firing an inflammable mixture in the combustion chamber. The gases explode and are rapidly exhausted; thus a steep pressure rise, followed by an immediate drop in pressure, is produced. Through the inertia of the gases, in conjunction with cooling through heat exchange at the chamber walls, an overall negative pressure is produced, and a quantity of the surrounding atmosphere, plus fuel, plus a small portion of the exhaust gases still in the exhaust pipe, is sucked into the chamber. As the temperature in the chamber is still high, the new intake also explodes and the process is repeated.

The maximum detonation velocity is achieved by variations in the internal walls of the combustion chamber. If ignition is started by a local source, then a normal wave front will appear and the transition to detonation occurs only at the end of an appreciable pre-detonation run.

In the M.H.D. configuration proposed herein, the combustion chamber will open into an argon plasma section where the passage of the propagating shock wave will ionize the gaseous argon. It is expected that this will enhance general ionization.

Accordingly, this invention provides a magneto-hydrodynamic generator utilizing pulsating combustion, comprising a first means defining a central combustion chamber and a radial expansion chamber annularly surrounding the combustion chamber and communicating therewith. The expansion chamber is defined between two opposing walls. Second means are provided for introducing a combustible fuel mixture into the combustion chamber, and third means are present for initiating pulsating combustion within the combustion chamber, so that gas flow in the expansion chamber fluctuates with time. Fourth means are provided for ionizing gas in the expansion chamber, while fifth means are present for applying an external magnetic field to the expansion chamber. Finally, electrically conductive means are provided for extracting electrical power from the ionized fluctuating gas flow in the expansion chamber.

In another aspect, this invention provides a method of generating electrical power magneto-hydrodynamically, utilizing a central combustion chamber and a radial expansion chamber annularly surrounding the combustion chamber and communicating therewith, the expansion chamber being defined between two opposed walls. The method includes several steps. First, a combustible fuel mixture is introduced into the combustion chamber and the pulsating combustion is initiated and maintained within the combustion chamber. The gas is then ionized in the expansion chamber, and electrically conductive means are employed for extracting electrical power from the ionized gas flow in the expansion chamber, while applying an external magnetic field thereto.

GENERAL DESCRIPTION OF THE DRAWINGS

Two embodiments of this invention are illustrated in the accompanying drawings, in which like numerals denote like parts throughout the several views, and in which.

DETAILED DESCRIPTION OF THE DRAWINGS

Figure 1:
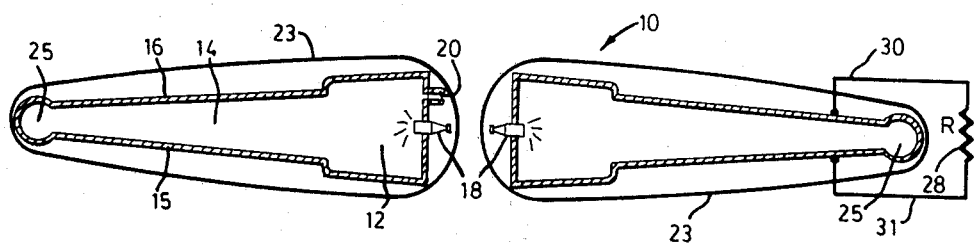
FIG. 1 is a schematic axial sectional view through a magneto-hydrodynamic generator built in accordance with the first embodiment of this invention.
Figure 2:
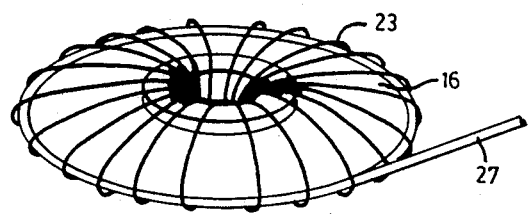
FIG. 2 is a perspective view of the M.H.D. generator of FIG. 1.

Attention is first directed to FIG. 1, which shows a magneto-hydrodynamic generator 10 which includes means defining a central, annular combustion chamber 12 and a radial expansion chamber 14 annularly surrounding the combustion chamber and communicating therewith. The expansion chamber 14 is defined between two opposing walls 15 and 16. Spark plugs 18 are provided for initiating pulsating combustion within the combustion chamber 12, while means for introducing a combustible fuel mixture into the combustion chamber is represented schematically by the tube-like entry port 20 in FIG. 1. Because the structure of the fuel-introducing means is conventional, it has not been shown in FIG. 1. Means are provided for applying an external magnetic field to the expansion chamber 14, the means including a toroidal winding 23, the geometry of which can be seen more particularly in FIG. 2. By passing a direct current through the toroidal winding 23, a magnetic field will be established in which the flux lines run generally circumferentially with respect to the annular expansion chamber 14. Outwardly and annularly surrounding the expansion chamber 14 is a gas-collection chamber 25 into which the exhaust gases empty. A duct 27 is provided to lead the exhaust gases away from the unit.

Figure 5:
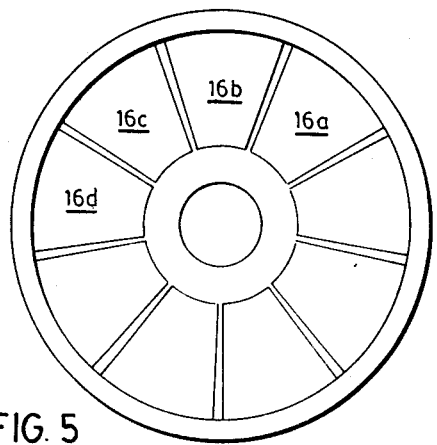
FIG. 5 is partial plan view of a first embodiment of the M.H.D. generator.

Schematically shown at the right in FIG. 1 is an electrical load 28, connected in a loop by wires 30 and 31 with the walls 16 and 15, respectively, which are constructed of electrically conductive material. If desired, the electrically conductive walls 15 and 16 can be replaced by segmented electrodes, such as shown at 16a-16d in FIG. 5. The individual electrodes 16a-16d are not in contact, which allows separate loads to be coupled to them. It is to be understood that the lower wall would also have individual electrode segments to match the ones visible in FIG. 5 and aligned therewith.

In operation, the first embodiment of this invention would produce a generalized radial outflow of exhaust gases passing through the chamber 14, upon which a series of shock waves would be superimposed. By providing argon in the chamber 14, ionization could be enhanced. Since the magnetic flux lines run circumferentially within the chamber 14, fluctuating movement of ionized particles in the plane of the disc will cause the super-imposition of motion at right angles to the magnetic flux lines and also to the direction of fluctuating motion. Thus, the ionized particles will have a component of motion in the axial direction relative to the disc. This will place an alternating electrical charge across the pairs of electrodes or across the walls 15 and 16, which can be extracted using the appropriate circuitry, represented schematically by the load 28 and wires 30, 31 in FIG. 1.

Preferably the means defining the first or combustion chamber 12 is electrically insulated, as is the means defining the annular chamber 25.

Figure 4:
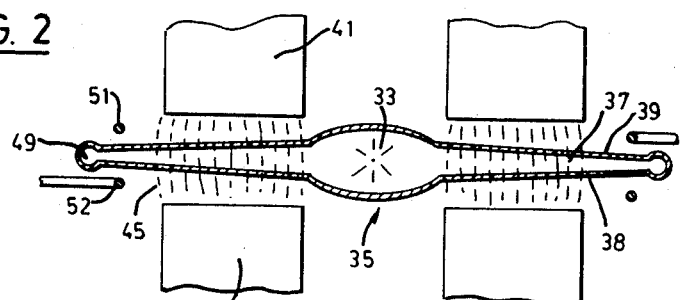
FIG. 4 is a part axial sectional view through the second embodiment.
Figure 3:
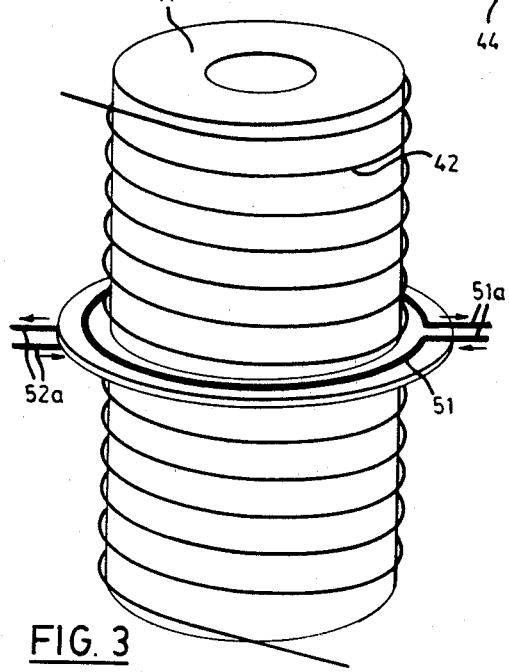
FIG. 3 is a perspective view of a second embodiment of this invention.

Attention is now directed to FIGS. 3 and 4, for a description of the second embodiment of this invention.

In FIG. 4, the combustion chamber 33 is not annular as in FIG. 1, but is positioned at the center of the disc-shaped M.H.D. generator 35 with suitable means for initiating and maintaining pulsating combustion within the combustion chamber 33. As with the first embodiment, a radial expansion chamber 37 annularly surrounds the combustion chamber 33 and communicates therewith, the expansion chamber being defined between two walls 38 and 39. Suitable means (not shown) are provided for introducing a combustible fuel mixture into the combustion chamber 33, and means such as argon is provided for producing ionization in the expansion chamber 37.

In the second embodiment of this invention, the means for applying an external magnetic field to the expansion chamber 37 includes a two-part cylindrical electro-magnet 41 having a winding shown schematically by the numeral 42. By providing the electro magnet in two aligned parts, including a lower portion 44, the magnetic flux lines (shown as broken lines 45 in FIG. 4) will extend across the disc-shaped M.H.D. generator, i.e. in the general direction aligned with the axis of the generator. An exhaust-collecting chamber 49 is again provided annularly surrounding the expansion chamber 37, and for the same purpose as with the first embodiment.

With the flux lines extending as shown in FIG. 4, and the ionized particles moving forwardly and backwardly in the general direction of the plane of the disc-shaped generator 35, Faraday's law requires that the ionized particles pick up a component of motion which is circumferential with respect to the disc, so that the component is at right angles to the flux line and to the initial vibration direction of the ionized particles. The resultant movement of the ionized particles is likely to be somewhat complex, but being a fluctuating movement, it will itself give rise to a fluctuating magnetic field super-imposed upon the magnetic field represented by the flux lines 45. In order to extract energy from the system as a whole, two search coils 51 and 52 are provided, directly overlying and "sandwiching" the disc generator as can be seen in the Figures. The search coils 51 and 52 are simple "loops" and each has leads 51a, 52a, as the case may be.

It will thus be understood that a fluctuating magnetic field will be induced in the search coils 51, 52 by virtue of the fluctuating movement of the ionized particles within the expansion chamber 37.

In a preferred embodiment, this invention would utilize hydrogen burning in oxygen, since this combination avoids the difficulties inherent in the use of plasma or alkali seeding. Nonetheless, these other two approaches could be conceivably utilized, once additional technical advances were made the overcome the problems which now exist.

We claim:

1. A magneto-hydrodynamic generator utilizing pulsating combustion comprising:
   first means defining a central combustion chamber and a radial expansion chamber annularly surrounding the combustion chamber and communicating therewith, the expansion chamber being defined between two opposing walls which converge in the direction away from the combustion chamber in order to preserve a substantially constant cross-sectional area at increasing radii, and thus preserve the volumetric requirement of an expanding shock wave,
   second means for introducing a combustible fuel mixture into the combustion chamber,
   third means for initiating pulsating combustion within said combustion chamber, such that gas flow in the expansion chamber fluctuates with time,
   fourth means for ionizing gas in the expansion chamber,
   fifth means for applying an external magnetic field to the expansion chamber,
   and electrically conductive means for extracting electrical power from said ionized fluctuating gas flow in the expansion chamber.

2. The invention claimed in claim 1, in which said electrically conductive means includes at least one search coil in the vicinity of the expansion chamber, whereby the fluctuating magnetic field arising due to the non-uniform movement of ionized particles in the expansion chamber induces a fluctuating electrical potential in said at least one search coil.

3. The invention claimed in claim 1, in which said first means is electrically insulative, and said fifth means applies to at least part of the expansion chamber a magnetic field of which the flux lines have at least a component normal to the radial gas flow in the expansion chamber, whereby the Faraday effect causes ion motion normal to said flux line component to be superimposed upon gas flow in the expansion chamber, the electrically conductive means including sixth means for extracting electrical power from the resultant ionized gas flow.

4. The invention claimed in claim 3, in which said sixth means includes at least one search coil in the vicinity of the expansion chamber.

5. The invention claimed in claim 3, in which said sixth means includes electrode means in contact with said gas flow and electrical conductors from said electrode means.

6. The invention claimed in claim 5, in which the magnetic field flux lines run circumferentially through said expansion chamber, and in which the electrode means includes at least one electrode on one defining wall of the expansion chamber and at least one electrode on the opposed defining wall of the expansion chamber.

7. The invention claimed in claim 6, in which the electrode means includes a first plurality of electrodes on said one defining wall and a second plurality of electrodes on the opposed defining wall, the electrodes being aligned in pairs across said expansion chamber.

8. The invention claimed in claim 1, claim 2 or claim 3, in which the third means includes a spark plug.

9. The invention claimed in claim 1, claim 2 or claim 3, in which the gas in the expansion chamber includes argon, and in which said fourth means is constituted by the pressure shock waves within the expansion chamber arising due to the pulsating combustion.

10. The invention claimed in claim 1, claim 2 or claim 3, in which said fourth means includes the production of plasma-generating high temperatures within the expansion chamber.

11. The invention claimed in claim 1, claim 2 or claim 3, in which said fourth means includes means for seeding the gas in the expansion chamber with ionizable alkali metal.

12. A magneto-hydrodynamic generator utilizing pulsating combustion, comprising:
   electrically insulative means defining a central combustion chamber and an expansion chamber, the expansion chamber annularly surrounding the combustion chamber and communicating therewith, whereby gaseous products of combustion can exit radially away from the combustion chamber along said expansion chamber, the combustion chamber having a progressively smaller height away from the combustion chamber such as to preserve a substantially constant cross-sectional area at increasing radii, and thus preserve the volumetric requirement of an expanding shock wave,
   first means for introducing fuel and an oxidizing medium into the combustion chamber,
   second means for initiating pulsating combustion within said combustion chamber,
   third means for applying to said expansion chamber a magnetic field of which the flux lines have at least a component normal to the radial gas flow in the expansion chamber,
   fourth means for ionizing gaseous material in the expansion chamber, whereby the Faraday effect causes ion motion normal to said flux line component to be superimposed upon the flow of gaseous material in the expansion chamber,
   and electrically conductive means for extracting electrical power from said ionized gaseous material.

13. A method of generating electrical power magneto-hydrodynamically, utilizing a central combustion chamber and a radial expansion chamber annularly surrounding the combustion chamber and communicating therewith, the expansion chamber being defined between two opposed walls which converge in the direction away from the combustion chamber in order to preserve a substantially constant cross-sectional area at increasing radii, and thus preserve the volumetric requirement of an expanding shock wave, the method comprising the steps:
   introducing a combustible fuel mixture into the combustion chamber,
   initiating and maintaining pulsating combustion within said combustion chamber,
   ionizing gas in the expansion chamber,
   and employing electrically conductive means for extracting electrical power from the ionized gas flow in the expansion chamber, while applying an external magnetic field thereto.

14. The method claimed in claim 13, in which the method of employing electrically conductive means for extracting electrical power includes utilizing at least one search coil in the vicinity of the expansion chamber, whereby the fluctuating magnetic field arising due to non-uniform movement of ionized particles in the expansion chamber induces a fluctuating electrical potential in said at least one search coil.

15. The method claimed in claim 13, in which said opposed walls are electrical insulative, and in which the said magnetic field has flux lines with at least a component normal to the radial gas flow in the expansion chamber, whereby the Faraday effect causes ion motion normal to the flux line component to be superimposed upon gas flow in the expansion chamber, and extracting electrical power from the resultant ionized gas flow.

16. The method claimed in claim 15, in which the extraction of electrical power from the resultant ionized gas flow is carried out by means of a search coil located in the vicinity of the expansion chamber.

17. The method claimed in claim 15, in which electrical power is extracted from the resultant ionized gas flow by way of electrodes in contact with the gas flow and electrical conductors from the electrodes.

18. The method claimed in claim 17, in which the magnetic field flux lines run circumferentially through the expansion chamber, and in which the electrodes include at least one electrode on one defining wall of the expansion chamber and at least one electrode on the opposed defining wall of the expansion chamber.

19. The method claimed in claim 18, in which the electrode means includes a plurality of electrodes on one defining wall and a second plurality of electrodes on the opposed defining wall of the expansion chamber, the electrodes being aligned in pairs across the said expansion chamber.

20. The method claimed in claim 13, claim 14 or claim 15, in which the initiation of pulsating combustion within the combustion chamber is carried out by the use of a spark plug, and in which the maintenance of pulsating combustion within the combustion chamber arises automatically due to reflected shock waves.

21. The method claimed in claim 13, claim 14 or claim 15, in which the gas in the expansion chamber includes argon, and in which the step of ionizing gas in the expansion chamber arises due to the effect of the pressure shock waves in the expansion chamber on the argon.

22. The method claimed in claim 13, claim 14 or claim 15, in which the ionization of gas in the expansion chamber is carried out by applying high temperatures within the expansion chamber, whereby ionized plasma is generated.

23. The method claimed in claim 13, claim 14 or claim 15, in which the ionization of gas in the expansion chamber is carried out by seeding the gas with ionizable alkali metal.

24. The method claimed in claim 13, claim 14 or claim 15, in which the expansion chamber diminishes in thickness away from the combustion chamber.

* * * * *